United States Patent
Glorioso

(10) Patent No.: US 7,709,543 B2
(45) Date of Patent: May 4, 2010

(54) FLAMMABLE BLOWING AGENT CONTROL AND BLEND SYSTEMS FOR PUR/PIR FOAM

(75) Inventor: Sammie J. (Joey) Glorioso, Ridgeland, MS (US)

(73) Assignee: Apache Products Company, Anderson, SC (US)

( * ) Notice: Subject to any disclaimer, the term of this patent is extended or adjusted under 35 U.S.C. 154(b) by 1218 days.

(21) Appl. No.: 10/486,673

(22) PCT Filed: Aug. 16, 2002

(86) PCT No.: PCT/US02/26163

§ 371 (c)(1),
(2), (4) Date: Feb. 12, 2004

(87) PCT Pub. No.: WO03/015905

PCT Pub. Date: Feb. 27, 2003

(65) Prior Publication Data

US 2004/0225024 A1    Nov. 11, 2004

Related U.S. Application Data

(60) Provisional application No. 60/313,300, filed on Aug. 17, 2001, provisional application No. 60/338,406, filed on Dec. 6, 2001.

(51) Int. Cl.
*C08J 9/14*    (2006.01)

(52) U.S. Cl. ............ 521/79; 366/162.4; 366/177.1; 366/181.6; 366/184; 422/133; 422/305; 521/131; 521/155; 521/170; 521/174

(58) Field of Classification Search ............ 366/162.4, 366/177.1, 181.6, 184; 422/133, 305, 306; 521/79, 131, 155, 170, 174
See application file for complete search history.

(56) References Cited

U.S. PATENT DOCUMENTS

| | | | | |
|---|---|---|---|---|
| 5,154,088 A | * | 10/1992 | Lehnert et al. | ........ 73/866 |
| 5,254,600 A | * | 10/1993 | Blanpied et al. | ........ 521/125 |
| 5,286,759 A | | 2/1994 | Smits et al. | |
| 5,403,088 A | | 4/1995 | Killmer et al. | |
| 5,444,100 A | | 8/1995 | Takezawa et al. | |
| 5,723,506 A | * | 3/1998 | Glorioso et al. | ........ 521/79 |
| 5,837,742 A | * | 11/1998 | Fishback | ........ 521/172 |

\* cited by examiner

*Primary Examiner*—John Cooney
(74) *Attorney, Agent, or Firm*—Volpe and Koenig P.C.

(57) ABSTRACT

A system and a method of providing PUR/PIR foam using flammable blowing agent. The flammable blowing agent is introduced to PUR/PIR manufacturing equipment via an independent feed-line. This enables a flammable blowing agent storage vessel to be located off site from the foam manufacturing equipment. The independent flammable blowing agent feed-line couples the off-site flammable blowing agent storage vessel with the foam production system. The preferred flammable blowing agent is pentane.

25 Claims, 4 Drawing Sheets

FLAMMABLE BLOWING AGENT CONTROL AND BLEND SYSTEMS FOR PUR/PIR FOAM

The present invention relates to PUR/PIR Foam and, in particular, the manufacturer of such foam utilizing highly flammable materials such as pentane.

BACKGROUND

Polyurethane and polyisocyanurate (PUR/PIR) foams are well known in the art and are conventionally made utilizing a blowing agent. It is known to use hydrocarbons as a blowing agent in the manufacture of such foam. However, the highly flammable nature of some blowing agents, such as pentanes makes it unattractive for commercial use due to the extra precautions needed to assure plant safety. It would be desirable to develop processes for the utilization of flammable blowing agents in the commercial production manufacture of PUR/PIR foams.

SUMMARY OF THE INVENTION

The present invention provides commercially viable methods for utilizing flammable blowing agents such as pentane in the production of PUR/PIR foam. Preferably, the foam is manufactured utilizing an extruder and reservoir system, such as disclosed in U.S. Pat. No. RE 37,095. Conventionally, a polyol premix is introduced into a screw of an extruder from an on-site reservoir during the foam manufacturing process. In lieu of adding the flammable blowing agent, into a polyol premix, the blowing agent is added via a feed-line thereby enabling the blowing agent supply to be stored remotely from the main processing equipment.

Preferably, the flammable blowing agent (such as pentane) is stored in a tank contained in its own safety enclosure and a feed-line extends from the remote storage area to the extruder equipment. In a preferred embodiment, the pentane feed-line is connected with a polyol premix feed-line and the combined flow is directed to the ninth barrel of a twelve barrel extruder. The polyol premix reservoir feed-line includes an inline mixer downstream the connection with the pentane feed-line which provides some mixing of the combined flow of the premix and pentane prior to introduction into the screw of the extruder. A micro motion flow meter and pentane control valve may be provided on the pentane line to facilitate either operator or computer control of the pentane flow during processing.

In lieu of an extruder, other types of mixing equipment can be used to produce the foam. For example, the foam components can be pumped into a high pressure mixing chamber. In such conventional processing, a polyol premix is pumped into the high pressure chamber via one feed line and an isocyanate component is pumped into the chamber via a separate line. The invention provides for flammable blowing agent to be added either by coupling a separate flammable blowing agent line to the polyol premix line upstream from the polyol line high pressure pump or, alternatively, by a separate high pressure pump which provides the flammable blowing agent directly to the high pressure chamber via a separate flammable blowing agent line. In either case, the flammable blowing agent is stored remotely from the component reservoirs and mixing equipment which is used to manufacture the PIR/PUR foam.

By eliminating flammable blowing agent storage from the site of the mixing equipment, substantial cost savings are realized by reducing the amount of flame proofing required for the processing site as compared to the onsite storage of flammable blowing agent or the utilization of a flammable blowing agent premix in one of the on-site reservoirs of the mixing system. The flammable blowing agent line may also include a heat exchanger to control the temperature of the flammable blowing agent which is introduced to the mixing equipment.

Other objects or advantages of the invention will be apparent to one of ordinary skill in the art from the following detailed description of the invention.

BRIEF DESCRIPTIONS OF THE DRAWINGS

DETAILED DESCRIPTION OF THE PREFERRED EMBODIMENTS

Figure 1:
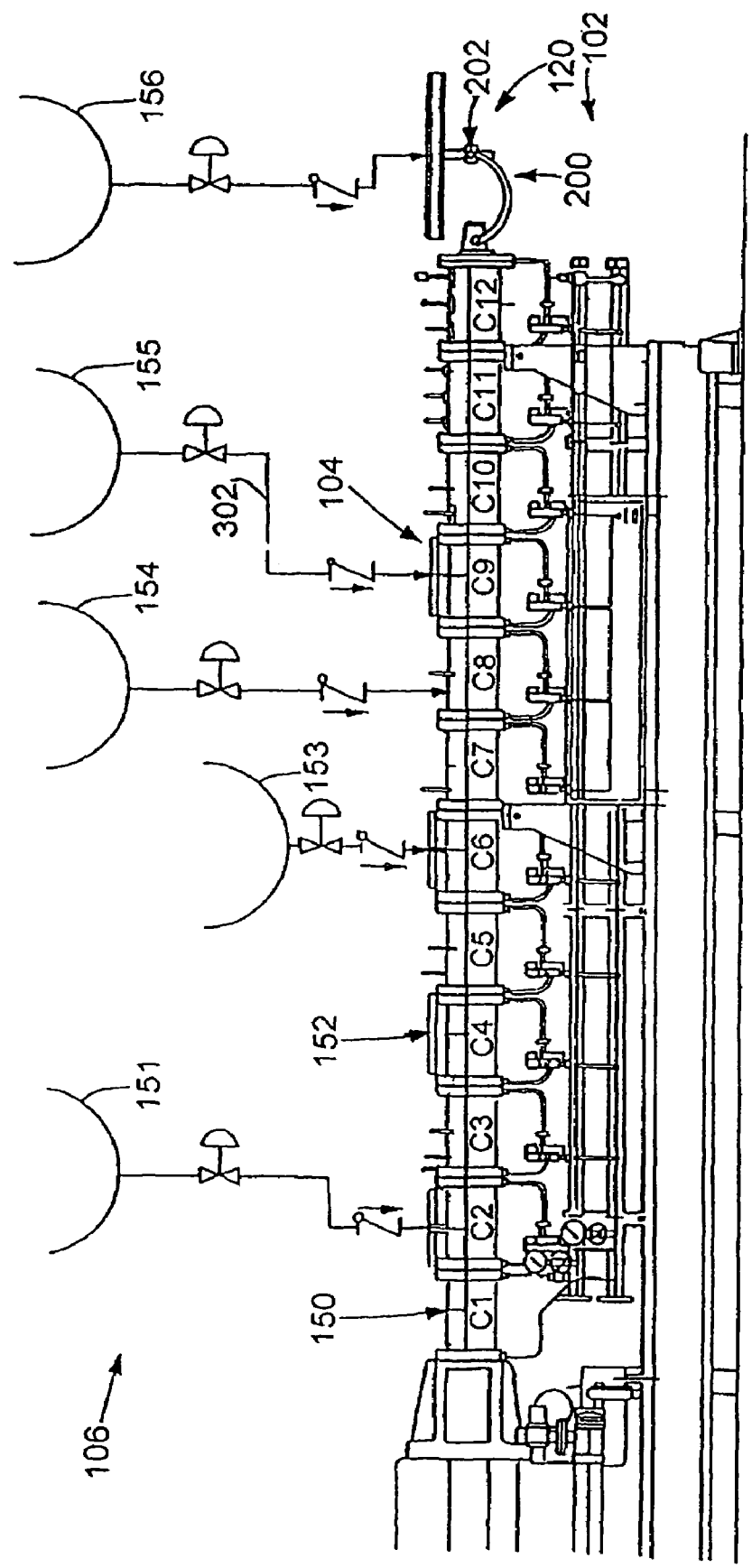
FIG. 1 is a schematic illustration of an extruder system for the manufacture of PUR/PIR foam in a known manner.

With reference to FIG. 1, there is shown an extruder system 102 comprising a twelve-barrel extruder 104 and a reservoir system 106 for introducing the various components into the extruder barrels C1-C12 during the foam making process. In addition to reservoirs 151, 153, 154, 155 and 156 for the introduction of fluid material, the extruder includes feed ports 150 and 152 where granular material and solids may be conveniently added and mixed in the screw of the extruder as explained in detail in U.S. Pat. RE 37,095. Conventionally, the reservoirs 151, 153, 154, 155 and 156 are maintained on site with the extruder in the foam manufacturing area.

Figure 2:
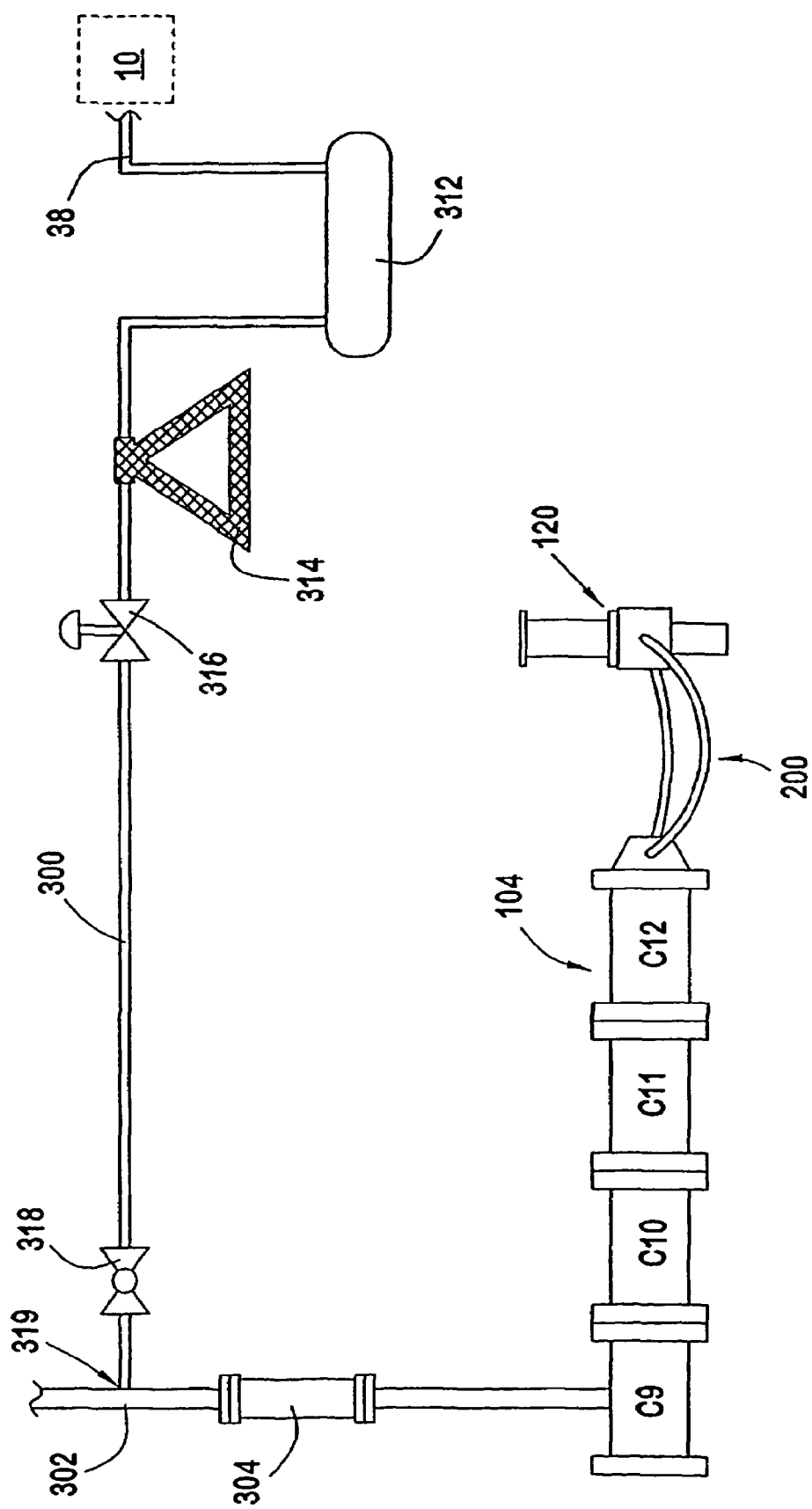
FIG. 2 is a portion of a modified extruder system in accordance with the teachings of the present invention.

With reference to FIG. 2, the inventive processing system includes a pentane line 300 preferably coupled with a reservoir feed-line 302 which connects reservoir 155 to the ninth barrel C9 of the extruder 104. Feed-line 302 is preferably provided with an inline mixer 304 downstream of the coupling of the pentane line 300 and the feed-line 302. The mixture is mixed with the isocyanate and other components in the last extruder barrels C10-C12 which connect via a hose 200 with the extruder head 120 where the catalyst is added.

The pentane line preferably extends from a storage tank 10 which is located off site. On site components of the pentane feed-line preferably include a heat exchanger 312, a micro motion flow meter 314, a control valve 316 and a check valve 318.

Figure 3:
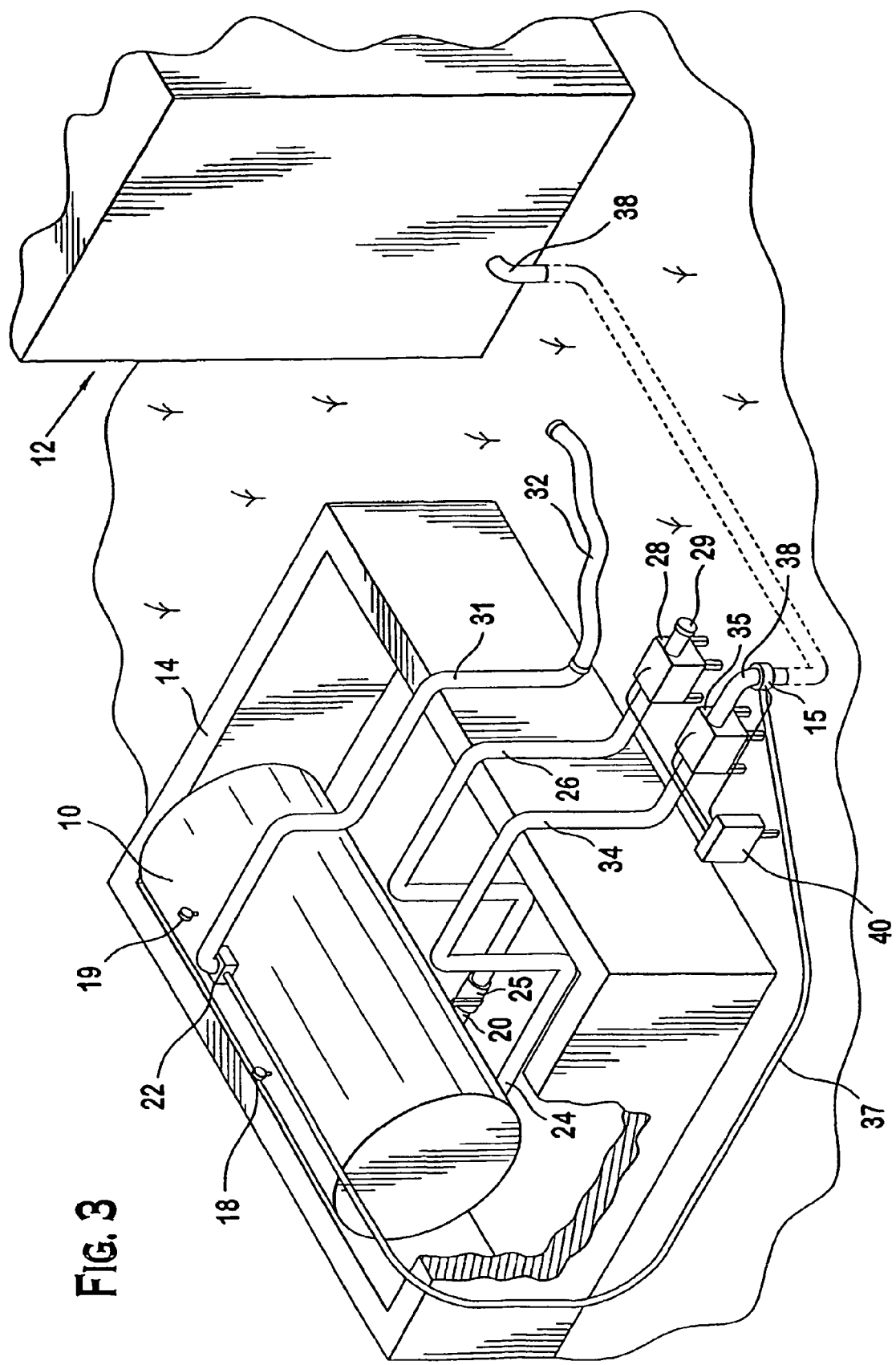
FIG. 3 is a perspective view of a storage system in accordance with the teachings of the present invention.

In one example, illustrated in FIG. 3, a 12,000 gallon (1 gallon=3.76 L), 250 psi (1 psi=0.0690 bar) horizontal Trinity Industries tank 10 was installed in a location remote from the process plant 12 to store the flammable blowing agent. The tank is contained in a concrete dike 14 isolated from the plant 12. Installed on the tank 10 are two internal relief valves, a level gauge 18 and a pressure gauge 19. The tank has one 2" (1"=2.54 cm) inlet 20, one 2" vapor outlet 22, and one 3" outlet 24 located under one end.

Any blowing agent that is flammable, that is capable of being handled as a liquid and that expands reactive PUR/PIR matrix to yield a cellular foam is suitable for use in this invention. The flammability of the blowing agent is such that the flashpoint of the blowing agent, or any component thereof, is less than 100° F. (approx. 38° C.). Hydrocarbons, and partially halogenated hydrocarbons such as HFCs and HCFCs, are examples of such flammable blowing agents.

The blowing agent should be capable of being handled as a liquid sufficiently, so as to be able to be stored and pumped by the equipment. Although the blowing agent may have a normal boiling point below the ambient temperature, low boiling point blowing agents are also suitable for use in this invention. Liquification of low boiling point blowing agents can be achieved by cooling the apparatus, and/or by pressurizing the blowing agent. Thus, for example, HFC-245fa—which has a boiling point below room temperature, but is known in the art to be capable of being handled as liquid—is suitable for use in this invention.

The flammable blowing agents may be an essentially single compound, or it may be a mixture of various compounds. Such a mixture may be an azeotrope, or have an azeotrope-like characteristic.

Hydrocarbons selected may have four to six carbons, may be straight chained, branched, or cyclic. Examples of hydrocarbons include butanes, such as n-butane, i-butane, cyclobutane; pentanes, such as n-pentane, isopentane, cyclopentane, neopentane; aliphatic hexanes, such as n-hexane, 2-methylpentane, 3-methylpentane, 2,2-dimethylbutane, 2,3-dimethylbutane; and cyclic hexanes such as cyclohexane, methylcyclopentane, and various alkyl substituted cyclobutanes and cyclopropanes. Preferred hydrocarbons are isoherane, cyclopentane, n-pentane and isopentane, and any mixtures thereof. Most preferred hydrocarbons are cyclopentane and isopentane, and any mixture thereof.

Suitable hydrofluorocarbons, perfluorinated hydrocarbons, and fluorinated ethers (collectively referred to herein as HFC's) which are useful in accordance with the teachings of the present invention include; 1,1-difluoroethane (HFC-152a); 1,2-difluoroethane (HFC-142), heptafluoropropane; 1,1,1,2,2-pentafluoropropane; 1,1,1,3,3-pentafluoropropane (HFC-245fa); 1,1,1,3-tetrafluoropropane; 1,1,2,3,3-pentafluoropropane; 1,1,1,3,3-pentafluoro-n-butane; 1,1,1,2,3,3,3-heptafluoropropane (HFC-227ea); hexafluorocyclopropane (C-216); octafluorocyclobutane (C-318).

Suitable hydrochlorofluorocarbon blowing agents which may be used in accordance with the teaching of the present invention are 1-chloro-1,2-difluoroethane; 1-chloro-2,2-difluoroethane (HCFC-142a); 1-chloro-1,1-difluoroethane (HCFC-142b); 1,1-dichloro-1-fluoroethane (HCFC-141b); 1-chloro-1,1,2-trifluoroethane; 1-chloro-1,2,2-trifluoroethane; 1,1-dichloro-1,2-difluoroethane; 1-chloro-1,1,2,2-tetrafluoroethane (HCFC-124a); 1-chloro-1,2,2,2-tetrafluoroethane (HCFC-124); 1,1-dichloro-1,2,2-trifluoroethane; 1,1-dichloro-2,2,2-trifluoroethane (HCFC-123); and 1,2-dichloro-1,1,2-trifluoroethane (HCFC-123a); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and trans-chlorofluoroethylene (HCFC-1131).

The 2" inlet 20 has a ball valve 25 connected directly underneath to a welded 2" carbon steel (CS) pipe 26 running from under the tank over the dike wall where it connects into a 7½ HP (1 HP=745 W) explosion proof pump 28 for off loading supply trucks (not shown). A sight glass is positioned on the inlet side of the pump and a star fitting or Cam-lock fitting 29 is provided to connect the inlet line to a supply truck by use of a hose. While offloading supply trucks, the vapor pressure difference between the truck and the tank should be equalized. The 2" vapor outlet is piped (via a 2" welded CS pipe 31) to the containment wall and is provided with a hose 32 to connect to a truck's vapor line for equalizing the pressure in the tank to that of the truck. The offloading pump is operated by a disconnect and start/stop station 40 located approximately 30 feet (1 foot=0.305 m) from the storage tank.

The 3" outlet 24 under the tank is piped (via a 3" welded CS pipe 34) to a 15 HP magnetic driven explosion proof pump 35. When the process is off and the pump is running, the pentane is directed back into the tank by the use of a pressure relief valve 15 and a welded 1" CS pipe 37 connected to the top of the tank at the 2" inlet. If the process is in run mode, the pentane will flow out of the tank 10 into the pump 35 and through 1¼" piping 38 headed to production area. The process pump is preferably operated by a programmable logic controller located inside the production building 12, but can be manually operated outside by a disconnect and a start/stop station 40.

The tank 10 and valving are insulated. All offloading piping is insulated and the process line is insulated until entering the ground.

The 1¼ welded CS piping 38 runs 2 feet underground approximately 600 feet and is coated to protect the steel from corrosion. The piping 38 reappears out of the ground 3 feet before entering the building 12. Once inside the building 12 the welded and insulated 1¼ CS piping 38 is reduced to ½" piping and is directed into the shell side of a 4-pass tube heat exchanger 312, as shown in FIG. 2. The exchanger is connected to chilled water and can be bypassed if needed. From the exchanger the pentane is forced into a Micromotion flow meter 314. The flow meter 314 can measure flow rate, temperature, density, and chemical inventory. From the flow meter 314, the pentane is forced through a Kammer control valve 316 before the initial processing begins. A Micromotion transmitter that is wired into the flow meter 314 generates a flow rate signal and sends the signal to a PLC (programmable logic controller) of the extruder system 102. The PLC uses information from the flow meter 314 to calculate and determine whether the control valve 316 should be further opened or closed. This process allows the operator to set the desired pentane flow rate and temperature by the use of a computer or man-machine interface (MMI). The MMI is also connected to the PLC.

After the pentane flow leaves the control valve 316 at the operators desired flow rate it enters, by a tee fitting 319 located above the static mixer 304, into the premix process line 302. The premix is a blend of various chemicals used in polyurethane production known as the B-side, comprising, polyols, catalysts, surfactants, water and like. The two chemicals lines become one and both pentane and premix flow directly through mixer 304, preferably a 3" Ross ISG motionless mixer having 10 elements. The two flows are homogenized before entering into the 9th barrel C9 of the twin-screw extruder (Model ZSK 92) 104. The temperature of mixture is further controlled by chilled water circulating through the extruder barrels C1-C12. The flow is then mixed with an polyisocyanate and various other chemicals (A-side) or "isocyanate" side which were added in upstream barrels C1-C8. All the components are mixed for the last 3 barrels of the 12-barrel extruder 104. The last three barrels preferably contain the screw shaft element configuration set forth in Table 1. This configuration is preferred in order for a homogeneous mix of all the components with the pentane and can be modified to allow for processing variations. The screw speed is adjusted to accommodate the different flow rate requirements (throughputs), preferably 600-1000 rpm

TABLE 1

| # of elements | Length (mm) | Element | Werner-Pfleiderer Item # | Segment Length (mm) |
|---|---|---|---|---|
| 3 | 40 | 40/40 | 8092-00.21-040/040-24 | 120 |
| 2 | 60 | 60/60 | 8092-00.21-060/060-24 | 120 |
| 2 | 80 | 80/80 | 8092-00.21-080/080-24 | 160 |
| 2 | 120 | 120/120 | 0892-00.244-120/120-24 | 240 |
| 1 | 60 | 120/60 | 8092-00.244-120/060-24 | 60 |
| 5 | 80 | 80/80 | 8092-00.244-080/080-24 | 400 |
| 2 | 60 | 60/60 | 8092-00.21-060/060-24 | 120 |
| 1 | 80 | KB90/5/80 | 8092-00.26-905/040-24 | 80 |
| 1 | 80 | 80/80 | 8092-00.224-080/080-24 | 80 |
| 4 | 60 | 60/60 | 8092-00.21-060/060-24 | 240 |
| 2 | 40 | KB45/5/40 | 8092-00.244-405/040-24 | 80 |
| 1 | 40 | 80/40 | 8092-00.244-080/040-24 | 40 |
| 1 | 80 | KB90/5/80 | 8092-00.26-905/040-24 | 80 |
| 1 | 40 | KB45/5/40 LH | 8092-00.56-405/040-24 | 40 |
| 1 | 60 | 60/60 | 8092-00.21-060/060-24 | 60 |
| 2 | 40 | KB45/5/40 | 8092-00.21-405/040-24 | 80 |
| 1 | 40 | 80/40 LH | 8092-00.51-080/040-24 | 40 |
| 4 | 60 | 60/60 | 8092-00.21-060/060-24 | 240 |
| 2 | 40 | 40/40 | 8092-00.21-040/040-24 | 80 |
| 3 | 20 | TME22.5/20 | 8091-00.15R225/020-24 | 60 |
| 1 | 40 | 40/40 | 8092-00.21-040/040-24 | 40 |
| 3 | 20 | TME22.5/20 | 8091-00.15R225/020-24 | 60 |
| 1 | 20 | TME 22.5/20 LH | 8091-00.15L225/020-24 | 20 |
| 1 | 40 | 40/40 | 8092-00.21-040/040-24 | 40 |
| 3 | 20 | TME22.5/20 | 8091-00.15R225/020-24 | 60 |
| 3 | 40 | 40/40 | 8092-00.21-040/040-24 | 20 |
| 3 | 20 | TME22.5/20 | 8091-00.15R225/020-24 | 60 |
| 1 | 20 | TME22.5/20 | 8091-00.15L225/020-24 | 20 |
| 3 | 20 | TME22.5/20 | 8091-00.15R225/020-24 | 60 |
| 1 | 40 | 40/40 | 8092-00.21-040/040-24 | 40 |
| 2 | 20 | TME22.5/20 | 8091-00.15R225/020-24 | 40 |
| 1 | 40 | 40/40 | 8092-00.21--040/040-24 | 40 |
| 5 | 60 | 60/60 | 8092-00.21-060/060-24 | 300 |
| 1 | 40 | KB45/5/40 | 8092-00.244-405/040-24 | 40 |
| 2 | 40 | 40/40 | 092-00.21-040/040-24 | 80 |
| 1 | 40 | KB45/5/40 | 8092-00.244-405/040-24 | 40 |
| 1 | 40 | 80/40 | 8092-00.21-080/040-24 | 40 |
| 5 | 40 | 40/40 | 8092-00.21-040/040-24 | 200 |
| 2 | 1 | Spacer/1 | 8060-43.04-001/001-24 | 2 |
| 9 | 40 | ZME20/40 | 8091-244.92-397/040-33 | 360 |

Upon exiting the last extruder barrel C12, the A-side/B-side mixture flows into a mechanical extruder mixing head 120 containing a rotary impeller driven by a hydraulic motor; or containing motionless elements to achieve adequate catalyst mixing. The catalyst blend is added from reservoir 156 into the head 120 and the A-side/B-side mixture is mixed with the catalyst at approximately 6,000 rpm.

Figure 4:
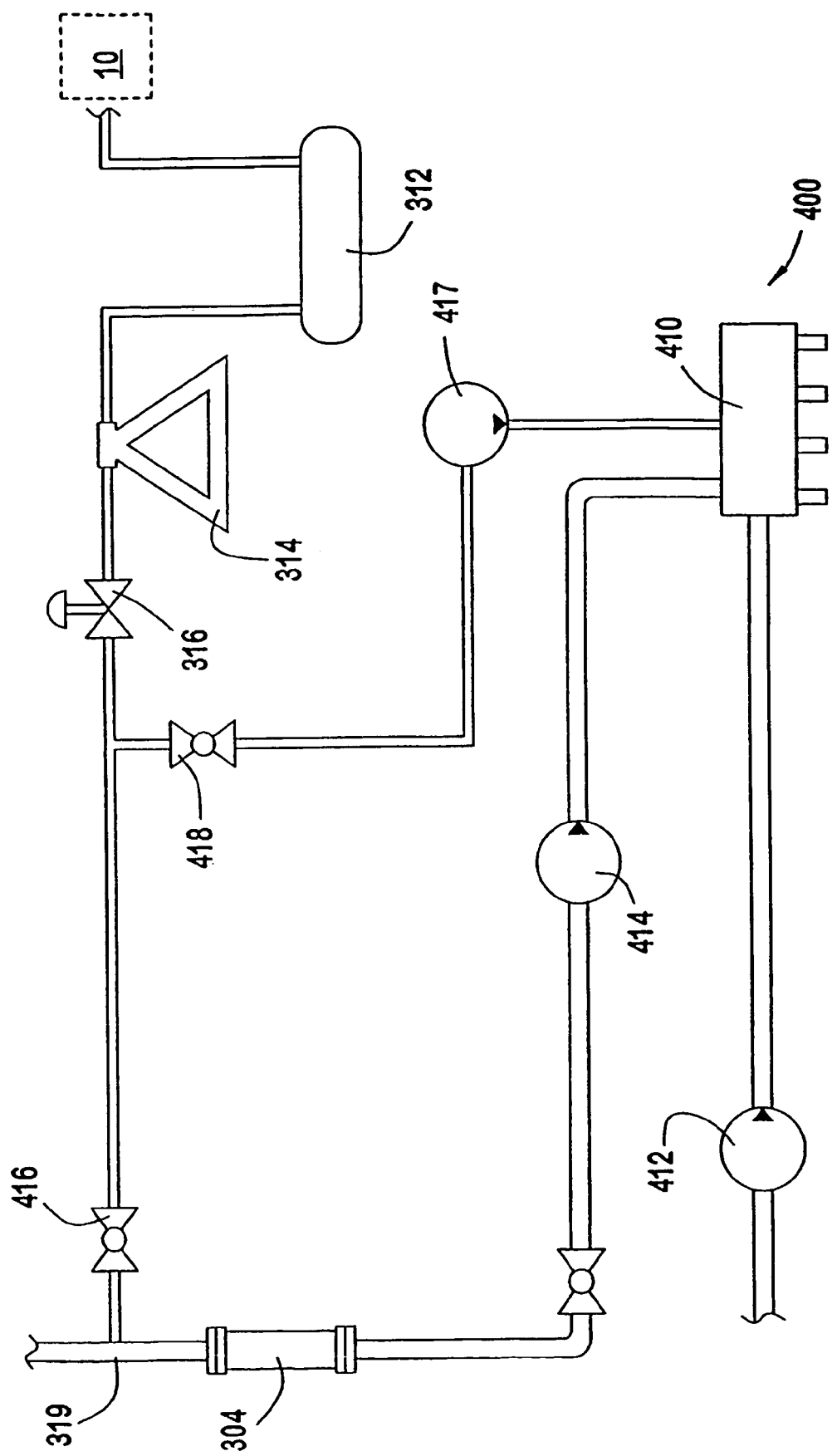
FIG. 4 is a schematic illustration of an alternative embodiment which employs a high pressure mixing chamber.

With reference to FIG. 4, there is shown an alternate embodiment of the invention wherein a high pressure mixing system 400 is utilized in lieu of an extruder. The high pressure mixing system 400 includes a high pressure mixing chamber 410, an associate isocyanate high pressure pump 412 for introducing an isocyanate component into the pressure chamber 410 and a polyol high pressure pump 414 for introducing a polyol premix component into the high pressure chamber 410. Pentane is remotely stored and preferably introduced to the processing site as explained above in connection with FIGS. 2 and 3 above so that the flow of pentane to the process is controlled by pentane control valve 316.

As illustrated in the embodiment of FIG. 4, pentane can be directed either to the polyol premix line via a pentane line valve 416 or to a pentane high pressure pump 417 via a bypass line valve 418. When the pentane line valve 416 is open, the pentane enters the polyol premix line via the T fitting 319 to preferably pass through an inline mixer as described above in connection with FIG. 3. This results in the pentane being introduced to the high pressure mixing chamber 410 along with the polyol premix via the polyol high pressure pump 414. When the pentane bypass line valve 418 is open, the pentane flows to the pentane high pressure pump 417 which pumps the pentane directly into the high pressure mixing chamber 410. Normally one of the two valves 416, 418 will be open and the other closed so that the pentane flow is either directed directly to the high pressure chamber via pentane pump 417 or is only provided to the polyol premix line via T fitting 319.

Normally pentane would not be added via both valves 416, 418 at the same time. However, it would be possible to do so if desired. In lieu of providing alternate pathways for introduction of the pentane to the high pressure mixing chamber, the system may be readily designed with only one pentane pathway, either via a T fitting 319 into the polyol premix line or via a high pressure pentane pump 417.

What is claimed is:

1. A system of manufacturing PUR/PIR foam using flammable blowing agent comprising:
   a reservoir system having a plurality of reservoirs coupled with mixing equipment having a plurality of feed-lines disposed at a production site;
   a flammable blowing agent storage vessel disposed at a remote site isolated from said production site; and
   a flammable blowing agent feed-line and an associated pump coupling the flammable blowing agent storage vessel with one of the feed-lines of the plurality of reservoirs such that flammable blowing agent is pumped from said remote storage vessel and introduced into the mixing equipment in connection with at least one other fluid component during the manufacturer of PIR/PUR foam using said mixing equipment.

2. The system according to claim 1 wherein said mixing equipment is a multi-barrel extruder having a polyol premix reservoir and an associated polyol premix feed-line and said flammable blowing agent feed-line is coupled with said polyol premix feed-line.

3. The system according to claim 2 wherein said polyol premix feed-line feeds an extruder barrel downstream of an extruder barrel which receives isocyanate from an isocyanate feed line associated with an isocyanate reservoir and said polyol premix feed-line includes an inline mixer downstream of the coupling with said flammable blowing agent feed-line.

4. The system according to claims 3, wherein said flammable blowing agent is selected from the group consisting of isopentane, cyclopentane, dimethylbutane, and n-pentane.

5. The system according to claim 1 wherein said mixing equipment is a high pressure mixing system having a polyol premix reservoir and an associated polyol premix feed-line and said flammable blowing agent feed-line is coupled with said polyol premix feed-line.

6. The system according to claim 5 wherein said high pressure mixing system includes a high pressure mixing chamber, a first high pressure pump for introducing an isocyanate component to the high pressure mixing chamber, and a second high pressure pump for introducing a combined flow of flammable blowing agent and polyol premix into the high pressure mixing chamber.

7. A system of manufacturing PUR/PIR foam using flammable blowing agent comprising:
   a reservoir system having a plurality of reservoirs coupled with mixing equipment having a plurality of feed lines disposed at a production site;
   a flammable blowing agent storage vessel disposed at a remote site isolated from said production site;
   a high pressure mixing chamber;

a first high pressure pump for introducing an isocyanate component to said high pressure mixing chamber;

a second high pressure pump for introducing a polyol component to said high pressure mixing chamber;

each said high pressure pump associated with a respective component feed line; and a flammable blowing agent feed line and an associated pump coupling the flammable blowing agent storage vessel with a feed line associated with a high pressure pump such that flammable blowing agent is pumped from the remote storage vessel and introduced into the high pressure mixing chamber without any onsite storage in the production area.

8. The system according to claim 7 wherein the flammable blowing agent line is associated with a separate high pressure flammable blowing agent pump for introducing the flammable blowing agent component to said high pressure mixing chamber.

9. The system according to claim 7 wherein the flammable blowing agent line is coupled with a polyol premix component feed line and is introduced into said high pressure mixing chamber with the polyol premix via said second high pressure pump.

10. The system according to claim 9 wherein said flammable blowing agent is selected from the group consisting of isopentane, cyclopentane, dimethylbutane, and n-pentane.

11. The system according to claim 1, wherein the production site is located in a building and the flammable blowing agent storage vessel is located outside of the building.

12. The system according to claim 11, wherein the flammable blowing agent feed line includes an underground portion between the production site and the remote site.

13. The system according to claim 7, wherein the production site is located in a building and the flammable blowing agent storage vessel is located outside of the building.

14. The system according to claim 13, wherein the flammable blowing agent feed line includes an underground portion between the production site and the remote site.

15. The system according to claim 2, wherein the multi-barrel extruder is a twin-screw multi-barrel extruder.

16. The system according to claim 3, further comprising a mechanical extruder mixing head downstream of the multi-barrel extruder.

17. The system according to claim 3, wherein at least one terminal end barrel of the multi-barrel extruder is adapted to mix all components which are introduced to the extruder.

18. The system according to claim 1, further comprising a heat exchanger coupled to the flammable blowing agent feed-line and disposed at the production site.

19. The system according to claim 2, further comprising a heat exchanger coupled to the flammable blowing agent feed-line and disposed at the production site.

20. The system according to claim 3, further comprising a heat exchanger coupled to the flammable blowing agent feed-line and disposed at the production site.

21. The system according to claim 4, further comprising a heat exchanger coupled to the flammable blowing agent feed-line and disposed at the production site.

22. The system according to claim 5, further comprising a heat exchanger coupled to the flammable blowing agent feed-line and disposed at the production site.

23. The system according to claim 7, further comprising a heat exchanger coupled to the flammable blowing agent feed-line and disposed at the production site.

24. The system according to claim 12, further comprising a heat exchanger coupled to the flammable blowing agent feed-line and disposed at the production site.

25. The system according to claim 14, further comprising a heat exchanger coupled to the flammable blowing agent feed-line and disposed at the production site.

\* \* \* \* \*